United States Patent
Vanstone et al.

(10) Patent No.: US 8,793,500 B2
(45) Date of Patent: Jul. 29, 2014

(54) HYBRID SIGNATURE SCHEME

(75) Inventors: Scott Alexander Vanstone, Campbellville (CA); Robert Gallant, Corner Brook (CA); Robert J. Lambert, Mississauga (CA); Leon A. Pintsov, West Hartford, CT (US); Frederick W. Ryan, Jr., Oxford, CT (US); Ari Singer, Hamden, CT (US)

(73) Assignees: Certicom Corp., Mississauga (CA); Pitney Bowes Inc., Stamford, CT (US)

( * ) Notice: Subject to any disclaimer, the term of this patent is extended or adjusted under 35 U.S.C. 154(b) by 54 days.

(21) Appl. No.: 13/421,589

(22) Filed: Mar. 15, 2012

(65) Prior Publication Data

US 2012/0233469 A1 Sep. 13, 2012

Related U.S. Application Data

(63) Continuation of application No. 12/977,738, filed on Dec. 23, 2010, now Pat. No. 8,195,948, which is a continuation of application No. 11/812,811, filed on Jun. 21, 2007, now Pat. No. 7,877,610, which is a continuation of application No. 09/390,362, filed on Sep. 7, 1999, now Pat. No. 7,249,259.

(51) Int. Cl.
*H04L 9/28* (2006.01)
(52) U.S. Cl.
USPC .......................... 713/176; 713/171
(58) Field of Classification Search
CPC ... H04L 9/28; H04L 63/0428; G06F 21/6218; G06F 21/10; G06F 2221/2107
USPC .......................... 713/168, 170, 171, 176, 180
See application file for complete search history.

(56) References Cited

U.S. PATENT DOCUMENTS 5,005,200 A * 4/1991 Fischer .......................... 380/30
5,600,725 A 2/1997 Rueppel et al.
(Continued)

FOREIGN PATENT DOCUMENTS

EP 0639907 2/1995
EP 0918274 A2 5/1999
(Continued)

OTHER PUBLICATIONS

Information technology—Security techniques—Digital signature schemes giving message recovery—Part 2: Integer factorization based mechanisms; ISO/IEC JTC1/SC27 N2893, XX, XX, Jan. 1, 2001, pp. I-VII,01, XP001066548.

(Continued)

*Primary Examiner* — Jason K. Gee
*Assistant Examiner* — Sanchit Sarker
(74) *Attorney, Agent, or Firm* — Novak Druce Connolly Bove + Quigg LLP

(57) ABSTRACT

A signature scheme is provided in which a message is divided in to a first portion which is hidden and is recovered during verification, and a second portion which is visible and is required as input to the verification algorithm. A first signature component is generated by encrypting the first portion alone. An intermediate component is formed by combining the first component and the visible portion and cryptographically hashing them. A second signature component is then formed using the intermediate component and the signature comprises the first and second components with the visible portion. A verification of the signature combines a first component derived only from the hidden portion of the message with the visible portion and produces a hash of the combination.

24 Claims, 3 Drawing Sheets

(56) References Cited

U.S. PATENT DOCUMENTS

| | | | |
|---|---|---|---|
| 5,915,024 A * | 6/1999 | Kitaori et al. | 713/176 |
| 6,097,813 A * | 8/2000 | Vanstone et al. | 380/30 |
| 6,212,637 B1 * | 4/2001 | Ohta et al. | 713/176 |
| 6,279,110 B1 * | 8/2001 | Johnson et al. | 713/180 |
| 6,440,049 B1 * | 8/2002 | Belanger et al. | 493/14 |
| 6,516,414 B1 * | 2/2003 | Zhang et al. | 713/176 |
| 6,671,805 B1 * | 12/2003 | Brown et al. | 713/176 |
| 6,959,382 B1 * | 10/2005 | Kinnis et al. | 713/170 |
| 7,013,392 B1 * | 3/2006 | Sasaki et al. | 713/187 |
| 7,249,259 B1 | 7/2007 | Vanstone et al. | |
| 7,568,100 B1 * | 7/2009 | Moskowitz et al. | 713/176 |
| 7,877,610 B2 * | 1/2011 | Vanstone et al. | 713/180 |
| 8,195,948 B2 * | 6/2012 | Vanstone et al. | 713/180 |
| 8,467,535 B2 * | 6/2013 | Struik | 380/282 |
| 8,572,673 B2 * | 10/2013 | Duffy | 726/1 |
| 2001/0046291 A1 | 11/2001 | Vanstone et al. | |
| 2003/0004900 A1 * | 1/2003 | Schwartz et al. | 705/401 |
| 2004/0128395 A1 * | 7/2004 | Miyazaki | 709/229 |
| 2009/0030768 A1 * | 1/2009 | Ginter et al. | 705/9 |
| 2010/0005306 A1 * | 1/2010 | Izu et al. | 713/176 |
| 2012/0131322 A1 * | 5/2012 | Smith et al. | 713/2 |
| 2012/0233469 A1 * | 9/2012 | Vanstone et al. | 713/176 |
| 2013/0318357 A1 * | 11/2013 | Abraham et al. | 713/176 |

FOREIGN PATENT DOCUMENTS

| | | |
|---|---|---|
| EP | 9182740 | 5/1999 |
| EP | 1083700 | 3/2001 |
| JP | 10003257 | 1/1998 |
| WO | 0110078 | 2/2001 |

OTHER PUBLICATIONS

Coron, Naccache, Stern: "Crypto '99. Proceedings of the 19th Annual International Cryptology Conference: On the security of RSA padding", Aug. 19, 1999, pp. 1-18, Springer-Verlag, Berlin, Germany XP002193618.

Nyberg K et al: "Message Recovery for Signature Schemes Based on the Discrete Logarithm Problem", Designs, Codes and Cryptography, vol. 7, No. 1-2, 1996, pp. 61-81, Kluwer Academic Publishers, Boston, US, XP000905401 ISSN: 0925-1022.

"ISO/IEC FCD 9796-1: Digital signature schemes giving message recovery. Part 1: Mechanisms using redundancy." ISO/IEC JTC1/SC27, No. 2352, Jul. 7, 1999, XP001066549.

"ISO/IEC 9796-2: Digital signature schemes giving message recovery. Part 2: Mechanisms using a hash function." 1997(E), JTC1/SC27.

Menezes, Alfred J. et al., Handbook of Applied Cryptography, p. 363; 1997; CRC Press, Boca Raton, Florida.

Dujardin, C.; Search Report from corresponding European Patent Application No. 00119558.5; search completed Mar. 19, 2002.

English translation of JP10003257, published on Jan. 6, 1998.

* cited by examiner

HYBRID SIGNATURE SCHEME

CROSS REFERENCE TO RELATED APPLICATIONS

This application is a continuation of U.S. patent application Ser. No. 12/977,738 filed on Dec. 23, 2010, which is a continuation of U.S. patent application Ser. No. 11/812,811 filed on Jun. 21, 2007 (now U.S. Pat. No. 7,877,610), which is a continuation of U.S. patent application Ser. No. 09/390,362 filed on Sep. 7, 1999 (now U.S. Pat. No. 7,249,259), the contents of such applications being incorporated herein by reference.

TECHNICAL FIELD

The present invention relates to methods and apparatus for digitally signing a message.

BACKGROUND OF INVENTION

Digital signatures are used to sign a message generated by a correspondent so that the origin and authenticity of the message may subsequently be verified. In its basic form, a digital signature of a message is generated by signing the message with the originators private key. The message may then be recovered using the originators public key. A number of variants of this basic arrangement have been proposed with different attributes. Digital signature schemes are typically thought to fall into two generic classes, namely digital signatures with appendix and digital signatures with message recovery.

Digital signatures with appendix are categorized by the fact that the message signed is required as input to the verification algorithm. Although very popular (the DSS and ECDSA are examples of this mechanism) they may not provide as much bandwidth efficiency as other methods.

Digital signatures with message recovery are categorized by the fact that the message is not required as input to the verification algorithm. One goal when designing message recovery schemes is to defeat existential forgery attacks by defining a suitable redundancy function which will distinguish messages legitimately signed from signatures of random bit strings.

In many practical applications the data to be signed carries a certain amount of inherent redundancy. For example, four bytes of data might be reserved for the date but, in practice, 3 bytes suffice and so there are 8 bits of redundancy from this field. In order to ensure security it is necessary to provide a predetermined degree of redundancy within the message and accordingly the bandwidth efficiency is reduced.

To increase the bandwidth efficiency it is known to split the message in to two components, namely a hidden and a visible component. The hidden component is recovered during the verification process and the visible portion is used as an input to the recovery process. The hidden component must have sufficient redundancy to withstand an existential forgery attack and additional bits must be added to the message if it does not inherently possess this. In one of the proposed standards to implement such a scheme, ISO 9796 Part 2, the hidden component is utilised to generate a signature component c of the form $DES_R[H//SHA1(V)//I_A]$ where H is the hidden component,
V is the visible component
$I_A$ is an identifier of the signer
SHA1(V) is a cryptographic hash of the visible component, and
$DES_R$ is an encryption of the bit string.

This scheme however has the disadvantage that c is at least the number of bits in SHAT (V) bits longer, and, as it is included in the signature, the required bandwidth efficiency may not be achieved. Moreover, the scheme requires invocation of two hash operations as the value c is subsequently hashed for inclusion in the signature component. This computational complexity may make it unsuitable for certain applications.

It is therefore an object of the present invention to provide a signature scheme in which the above disadvantages are obviated or mitigated.

In general terms, one aspect of the present invention provides a signature scheme in which a message is divided in to a first portion which is hidden and is recovered during verification, and a second portion which is visible and is required as input to the verification algorithm. A first signature component is generated by encrypting the first portion alone. An intermediate component is formed by combining the first component and the visible portion and cryptographically hashing them. A second signature component is then formed using the intermediate component and the signature comprises the first and second components with the visible portion.

The generation of the first component from the first portion alone reduces the necessary bandwidth and simplifies the computation. The relative sizes of the first and second portions are determined by the application itself. In this manner, the redundancy function can be application dependent as opposed to a global primitive.

Recovery of the message can be completed using the signature and the public key of the sender.

According to a further aspect of the invention there is provided a verification of a signature of a message that has been subdivided into a hidden and visible portion. The verification combines a first component derived only from the hidden portion of the message with the visible portion and produces a hash of the combination. The computed hash is used together with publicly available information to generate a bit string corresponding to the hidden portion. If the required redundancy is present the signature is accepted and the message reconstructed from the recovered bit string and the visible portion.

BRIEF DESCRIPTION OF THE DRAWINGS

Embodiments of the invention will now be described by way of example only with reference to the accompanying drawings in which.

DETAILED DESCRIPTION OF A PREFERRED EMBODIMENT

Figure 1:
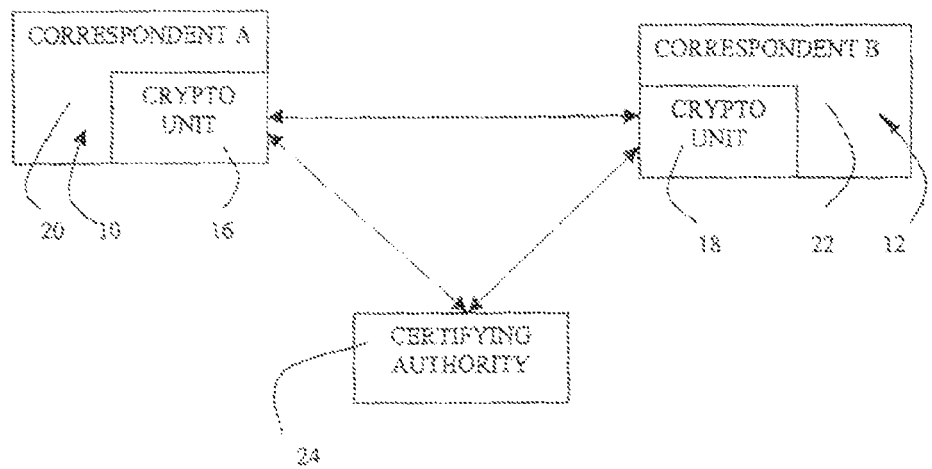
FIG. 1 is a schematic representation of a data communication system.

Referring to FIG. 1, a data communication system includes a pair of correspondents 10, 12 exchanging a message M over a communication channel 14. Each of the correspondents 10, 12 includes a cryptographic unit 16, 18 respectively and a terminal 20, 22 to generate and receive the message M. Each of the cryptographic units 16, 18 implements a public key encryption scheme that enables it to generate a session key, to encipher or decipher a message using the session key or to sign a message using a private key whereby the message can then be recovered using a public key corresponding to the private key. The general implementation of such schemes and their operating principles are well known. The encryption scheme may be loaded in to the encryption unit from a data carrier coded to implement the protocol under the direction of a general purpose computer or may be implemented on a chipset as preprogrammed instructions.

In the preferred embodiment described below, the encryption scheme is based on the intractability of the discrete log problem in finite groups and is implemented in an algebraic system defined on the points of an elliptic curve over a finite field, typically referred to as elliptic curve crypto systems. However, the signature scheme proposed may be applied to any ElGamal signature over any finite group.

The domain parameters of such an elliptic curve crypto system are a curve of the form $y^2=x^3+dx+c$ and a seed point P. One of the correspondents has a private key a, $0<a<n$ where n is the order of the point P and a corresponding public key $Q_A=aP$. The public key may be held in a certifying authority 24 shown in communication with the correspondents 10, 12 by ghosted lines.

The messages M generated by the correspondents 10, 12 are subdivided into two bit strings H and V (i.e. $M=H//V$) where H is a bit string which is hidden and recovered during the verification process and V is a bit string which is also signed but is required as input to the verification process.

Figure 2:
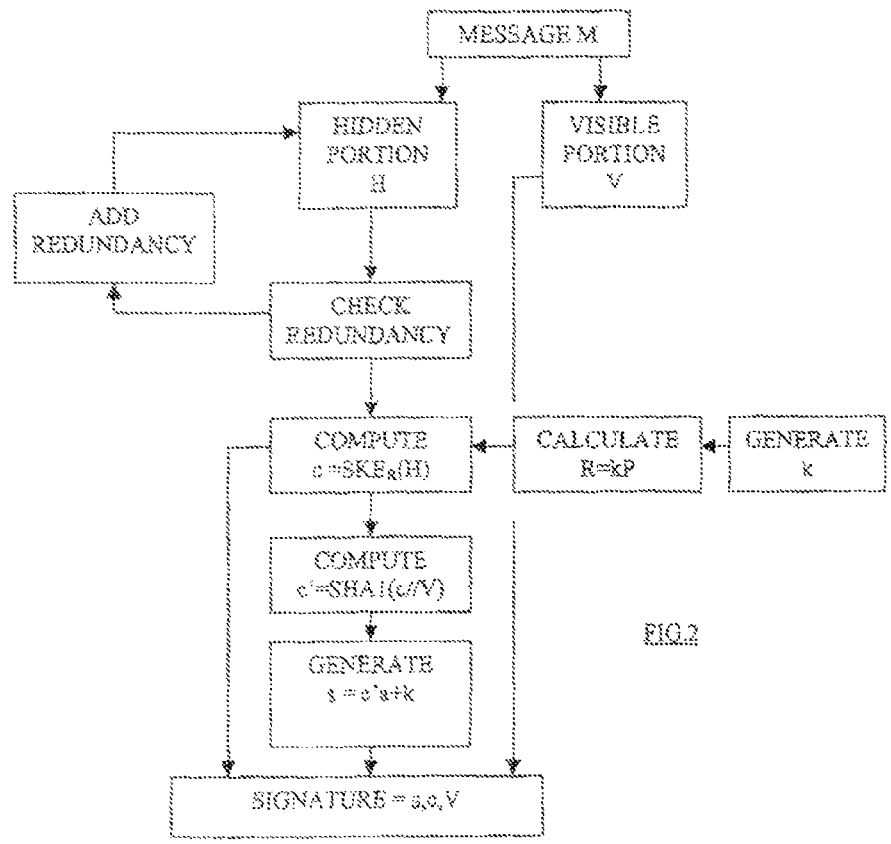
FIG. 2 is a flow chart showing the signature generation.

The signature generation algorithm is set out in the flow chart of FIG. 2. Initially the bit string H is examined to determine if it contains redundancy above a predetermined limit sufficient to prevent an existential forgery attack. If the examination determines that the original data forming the message M contains enough redundancy then H may simply be a subset of that data. If the predetermined redundancy is not found then H may be modified to contain artificially added redundancy such as additional bytes of O's.

By way of example, suppose 80 bits of redundancy is determined to be the predetermined lower limit for security reasons. If the bit string H contains no inherent redundancy then it would be necessary to add up to 10 bytes of 0's. To permit recovery of the message an indicator would be included, conveniently as a leading byte in either H or V, which tells the number of bytes of 0's added. Since the value is 0 to 10, 4 bits of the byte suffice as an indicator so the bit string contains an additional 4 bits of redundancy. If t is the number of redundancy bytes that can be added, then the data must inherently contain at least 80-8t bits of redundancy.

To sign the message $M=H//V$ the correspondent 10 generates a random integer k, $0<k<n$ in the cryptographic unit 14. Using k correspondent 10 then computes a value of a random point $R=kP$.

A value c is then computed from the bit string H only such that $c=SKE_R(H)$. $SKE_R$ refers to a symmetric-key algorithm under control of a key derived from the random point R. This could be derived by applying a function, such as a hash function, to R, truncating R, or using only one of the coordinates, e.g. the x coordinate as the key. If H is smaller than the key derived from R, then one possible SKE is simply to XOR H with a truncation of bits from the key derived from R. This effectively is a one-time pad. If H is larger than the key it is possible to use a DES based algorithm or simply to XOR repeatedly the key with H.

Using the bit string V, an intermediate component c' is computed such that $c'=SHA1 (c//V)$ where SHA1 is a cryptographically secure hash algorithm. If preferred, additional information such as a certificate or identifying information of correspondent 10 may be incorporated in to the hashed value c'.

It will be noted that the signature component c is the same length as the hidden portion H as it is a bit wise encryption of that portion and that the intermediate component c' is obtained with a single hash operation.

A signature component s is then computed from the values available to the correspondent 10 using any of the known ElGamal equations. A convenient equation is the Schnorr signature algorithm where $s=c'a+k$ (mod n). A signature is then formed from the components (s,c,V) and forwarded to the correspondent 12.

Figure 3:
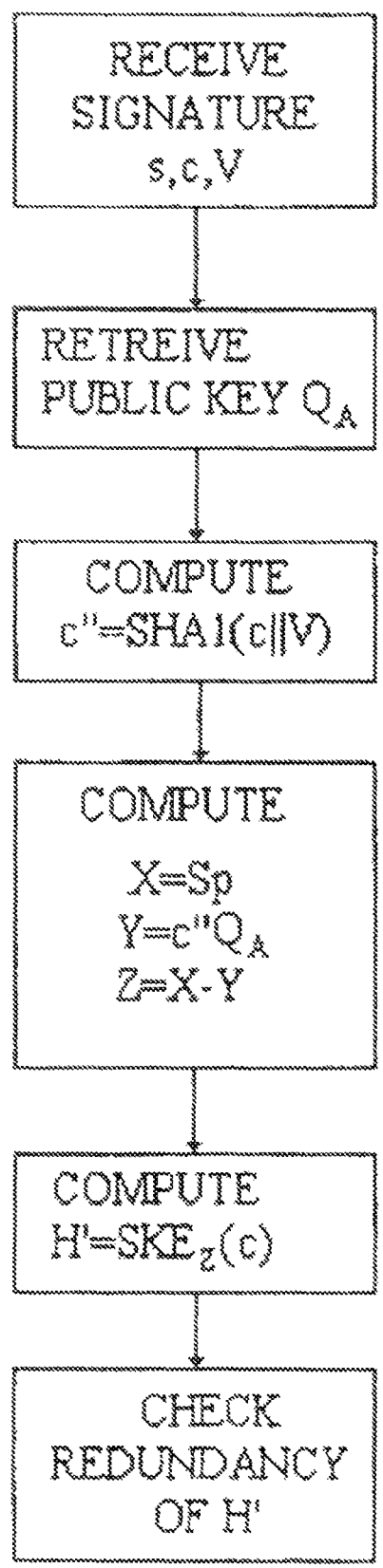
FIG. 3 is a flow chart showing the verification of the signature of FIG. 2.

Verification of the signature by correspondent 12 is performed by the application of the corresponding algorithm, as shown in FIG. 3 for the Schnorr signature. The correspondent 12 initially obtains an authentic copy of the public key $Q_A$ of the correspondent 10 from the certifying authority 24. The correspondent 12 then computes a value $c''=SHA1 (c//V)$ and derives from the information available in the signature, i.e. s,c,V and the system domain parameters, the values $X=sP$
$Y=c'' Q_A$
$Z=X-Y$ A bit string H' is then recovered by applying to the received signature component c the symmetric-key algorithm under control of a key derived from the point Z such that $H'=SKE_z(c)$. The bit string H' is then examined to determine if it has the required redundancy and if so the correspondent 12 accepts the signature of M and reconstitutes the message as $H'//V$.

Because the message M is subdivided, it is only necessary for the one portion, H, to contain the requisite redundancy. The other portion V, which is sent in the clear, may have the data structure of the original data and thereby improve the bandwidth efficiency.

Another feature of this scheme which is of practical and commercial interest is that the information encoded in c is only available to those individuals who have the public key $Q_A$ of correspondent 10. The data contained in V is available to all. There may be some information which correspondent 10 wants to hide from those not privy to $Q_A$ in which case the sender, i.e. correspondent 10 puts this information into the bit string H.

For example, in one particular application where the signature is used to authenticate postage applied to mail, a mailer may not want a receiver to know how many mail pieces he has sent. The post office (which verifies postage and therefore needs this information) has the public key of the mailer, and can recover this information on verification but the receiver cannot if he does not have the mailers public key.

Of course, if the public key $Q_A$ of the sender is contained in the indicium then this is also available to the receiver. Alternatively, the senders public key may be contained in a certificate that can only be recovered if the receiver has the certifying authority's public key. If this is not generally available then the contents of H will be hidden from the receiver.

Figure 4:
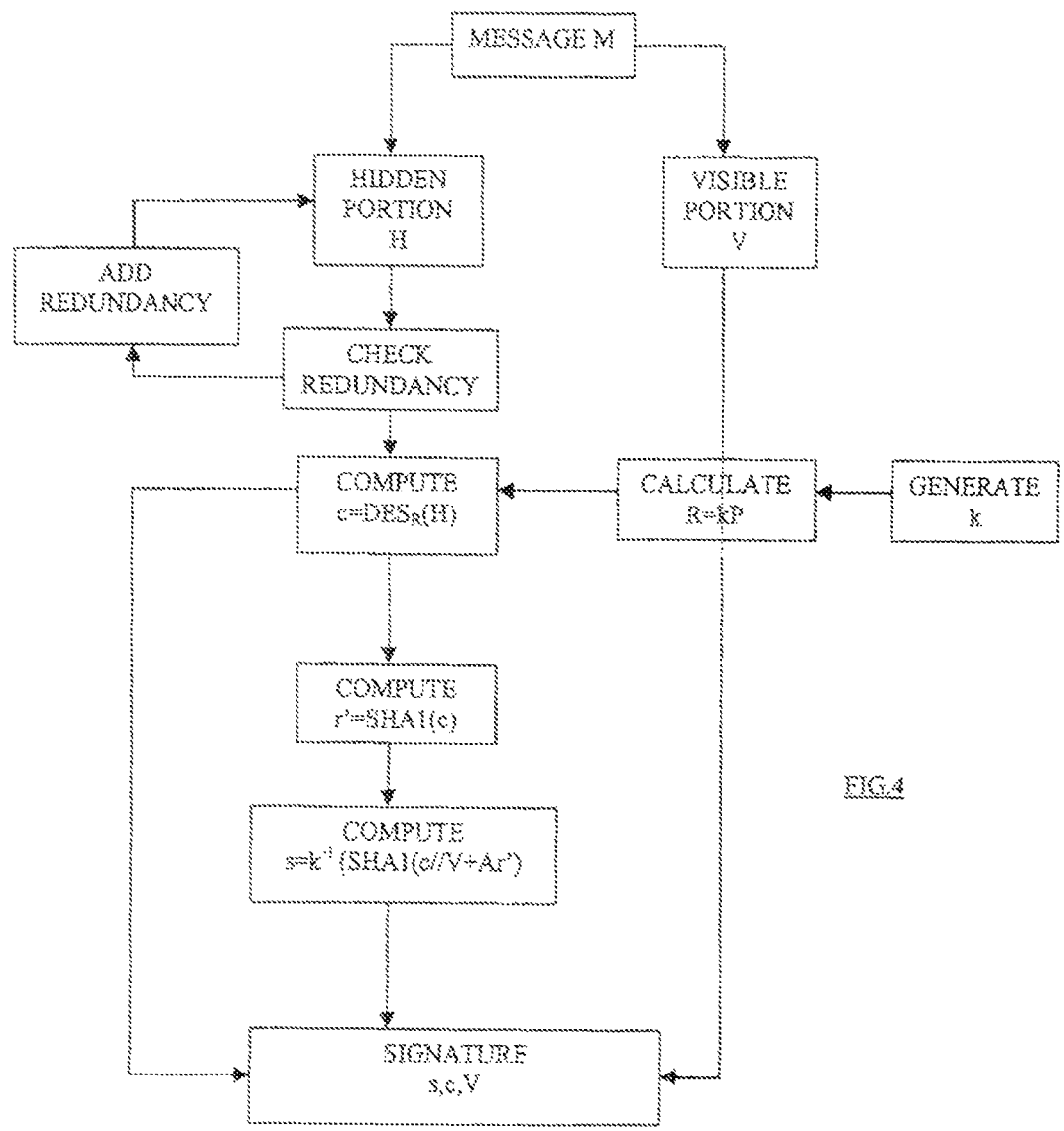
FIG. 4 is a flow chart showing a further embodiment of signature generation.

As indicated above, alternative forms of signing equations may be used. In a further embodiment shown in the flow chart of FIG. 4, a signing equation similar to the ECDSA standard is used. Normally in such an arrangement:—

$R=kP$
$c=DES_R (M)$
$r'=SHA1 (c)$
$s=k^{-1} \{SHA1 (c//ID_A)+a r'\}$ mod n where $ID_A$ is an identifier of the sender.
the signature is (s,c).

When used with a hybrid scheme described above the scheme is modified such that $R=kP$
$c=DES_R (H)$
$r'=SHA1 (c)$
$s=k^{-1} \{SHA1(c//V)+a r'\}$ mod n.
the signature is (s, c,V)

Again therefore because only a portion H of the message is used to generate the first component c, only that portion requires a specified redundancy. In the balance of the message a reduced redundancy may be utilised to maintain bandwidth efficiency.

The verification for the modified scheme will change accordingly to accommodate the partial message recovery and necessary redundancy.

We claim:

1. A method at a correspondent of digitally signing a message comprising a recoverable portion and a visible portion, said method comprising a processor of the correspondent:
    encoding said recoverable portion using an encryption function to obtain a first signature component;
    computing an intermediate signature component as a function of said first signature component and said visible portion;
    computing a second signature component by applying a signing scheme to said intermediate as a function of said first signature component, said visible portion and a private key associated with said correspondent; and
    providing a signature comprising said first signature component, said second signature component and said visible portion as signature components.

2. The method of claim 1 further comprising determining whether said recoverable portion meets selected redundancy criteria.

3. The method of claim 1 comprising modifying said recoverable portion to meet selected redundancy criteria prior to computing said first signature component.

4. The method of claim 1 further comprising generating a positive integer k and a corresponding point R =kP on an elliptic curve, wherein P is a point on said elliptic curve, and utilizing an x coordinate of said point R in encoding said recoverable portion.

5. The method of claim 4 wherein encoding said recoverable portion utilizes a key derived from said x coordinate of said point.

6. The method of claim 1 wherein computing said intermediate signature component comprises binding together said first signature component and said visible portion.

7. The method of claim 1 wherein said signing scheme utilizes an ElGamal signing equation.

8. The method of claim 1 wherein said signing scheme utilizes a Schnorr signing equation.

9. The method of claim 1 further comprising restricting access to a public key corresponding to said private key to restrict recovery of said recoverable portion.

10. The method of claim 3 wherein said modifying comprises adding data to said recoverable portion.

11. The method of claim 10 wherein said modifying comprises including an indicator to indicate the data added to said recoverable portion.

12. The method of claim 1 further comprising subdividing said message into said recoverable portion and said visible portion.

13. A method of verifying a signature associated with a message from a correspondent, the signature comprising a first signature component and a second signature component, said method comprising a processor of the correspondent:
    computing a value by binding together said first signature component and a visible portion of said message;
    computing a bit string by utilizing said value, said first signature component, said second signature component, and a public key of said correspondent;
    verifying said signature if said bit string meets a redundancy criteria.

14. The method of claim 13 wherein computing said bit string comprises utilizing a key derived from said value, said second signature component, and said public key to decode said first signature component.

15. The method of claim 13 further comprising reconstituting said message M using said bit string and said visible portion.

16. A non-transitory computer-readable medium comprising
    instructions that are operable when executed by a processor to perform operations for digitally signing a message comprising a recoverable portion and a visible portion, the operations comprising:
    encoding said recoverable portion using an encryption function to obtain a first signature component;
    computing an intermediate signature component as a function of said first signature component and said visible portion;
    computing a second signature component by applying a signing scheme to said intermediate as a function of said first signature component, said visible portion and a private key associated with said correspondent; and
    providing a signature comprising said first signature component, said second signature component and said visible portion as signature components.

17. The computer-readable medium of claim 16, wherein the operations further comprises modifying said recoverable portion to meet selected redundancy criteria prior to computing said first signature component.

18. The computer-readable medium of claim 16, wherein said signing scheme utilizes a Schnorr signing equation.

19. A non-transitory computer-readable medium comprising instructions that are operable when executed by a processor to perform operations for verifying a signature associated with a message from a correspondent, the signature
    comprising a first signature component and a second signature component, the operations comprising:
    computing a value by binding together said first signature component and a visible portion of said message;
    computing a bit string by utilizing said value, said first signature component, said second signature component, and a public key of said correspondent;
    verifying said signature if said bit string meets a redundancy criteria.

20. The computer-readable medium of claim 19 wherein said computing said bit string comprises utilizing a key derived from said value, said second signature component, and said public key to decode said first signature component.

21. A computing device comprising a processor operable to perform operations for digitally signing a message comprising a recoverable portion and a visible portion, the operations comprising the processor:
    encoding said recoverable portion using an encryption function to obtain a first signature component;
    computing an intermediate signature component as a function of said first signature component and said visible portion;
    computing a second signature component by applying a signing scheme to said intermediate as a function of said first signature component, said visible portion and a private key associated with said correspondent; and
    providing a signature comprising said first signature component, said second signature component and said visible portion as signature components.

22. The computing device of claim 21, wherein the operations further comprises modifying said recoverable portion to meet selected redundancy criteria prior to computing said first signature component.

23. A computing device comprising a processor operable to perform operations for verifying a signature associated with a message from a correspondent, the signature comprising a first signature component and a second signature component, the operations comprising the processor:
- computing a value by binding together said first signature component and a visible portion of said message;
- computing a bit string by utilizing said value, said first signature component, said second signature component, and a public key of said correspondent;
- verifying said signature if said bit string meets a redundancy criteria.

24. The computing device of claim 23 wherein said computing said bit string comprises utilizing a key derived from said value, said second signature component, and said public key to decode said first signature component.

* * * * *